United States Patent Office 3,040,105
Patented June 19, 1962

3,040,105
1,1,1,6,6,6-HEXANITROHEXYNE-3 AND PROCESS FOR PREPARING SAME
Pliny O. Tawney, Passaic, N.J., assignor to United States Rubber Company, New York, N.Y., a corporation of New Jersey
No Drawing. Filed Feb. 27, 1953, Ser. No. 339,481
3 Claims. (Cl. 260—644)

This invention relates to the new compound 1,1,1,6,6,6-hexanitrohexyne-3. This compound is useful as an explosive and/or propellant.

Those skilled in the art of explosives chemistry have long known that nitrogenous compounds which have a favorable oxygen balance, i.e., a sufficient amount of oxygen in the molecule to convert all or nearly all of the carbon and hydrogen of the molecule to carbon dioxide and water respectively, are highly desirable as explosives and propellants if they satisfy certain other requirements such as safety in handling, thermal stability, etc. It is evident that acetylenic compounds have a more favorable oxygen balance than do their saturated counterparts. Therefore, explosives chemists have long desired to make acetylenic polynitro compounds. However, heretofore, such compounds have proven to be so difficult to make and/or so extremely sensitive to shock that they could not be used by the explosives industry.

I have now found that the new compound 1,1,1,6,6,6-hexanitrohexyne-3 can be made by a simple procedure and that it is an explosive material which can be handled safely. It has a favorable oxygen balance of —9, i.e., it contains practically enough oxygen in the molecule to burn completely without needing external oxygen.[1]

This new compound is easily prepared by a metathetical reaction between silver nitroform and 1,4-dibromobutyne-2, or 1,4-dichlorobutyne-2, in an inert volatile solvent. It should be a solvent for the 1,4-dibromobutyne-2 or 1,4-dichlorobutyne-2 as well as a solvent for silver nitroform. Oxgenated solvents are operable, perhaps because of their highly polar nature. Examples of such solvents are lower alkyl esters of lower fatty acids, e.g., methyl acetate, ethyl acetate, methyl formate, ethyl formate, etc., ethers, e.g., diethyl ether, dimethyl ether, 1,4-dioxane, etc., ketones, e.g., acetone, methyl ethyl ketone, etc., lower aliphatic alcohols, e.g., methanol, ethanol, etc. I prefer those solvents which are anhydrous. I also prefer those solvents which are infinitely miscible with water since this permits separation of the desired product from the solvent and any excess silver nitroform by simply commingling with water. Otherwise, the solvent must be removed by volatilization. I employ a molar ratio of silver nitroform to 1,4-dibromobutyne-2 or 1,4-dichlorobutyne-2 equal to at least 2. As will be obvious from the equation for the reaction, if the molar ratio is less than 2, there will be an insufficient amount of silver nitroform to react with all of the halogen and the reaction product will be contaminated with 1,1,1-trinitro-5-chloropentyne-3 or the corresponding 5-bromo compound. The reaction is so rapid that it is completed within a few hours at room temperature. The silver halide, which precipitates in quantitative yield during the reaction, is removed from the solution by any convenient means, e.g., by filtration, and the solvent is evaporated in vacuo. The residual product can be purified, e.g., by recrystallization, if desired. The reaction is as follows:

$$2AgC(NO_2)_3 + XCH_2-C{\equiv}C-CH_2X \rightarrow$$
$$(NO_2)_3C-CH_2-C{\equiv}C-CH_2-C(NO_2)_3 + 2AgX$$

where X is bromine or chlorine.

The following example illustrates the preparation of my new compound.

Example

A solution of 11 g. of nitroform in 25 ml. of methyl acetate is added gradually to a suspension of 15 g. (an excess) of silver oxide in 100 ml. of methyl acetate with stirring and cooling in an ice bath. The mixture is stirred for an hour or two longer at this temperature, and then the excess silver oxide is filtered off. To the filtrate 5 g. of 1,4-dibromobutyne-2 (made as described by Johnson, J. Chem. Soc. 1009 (1946)), is added, and the solution is left at room temperature for several hours. Silver bromide begins to precipitate at once. When the reaction is complete, as shown by the quantitative formation of silver bromide, the mixture is filtered. The filtrate is partially evaporated in vacuo at room temperature, and then the residue is poured into water to remove the excess silver nitroform. The aqueous mixture is extracted several times with chloroform. The combined extracts are evaporated to small volume at room temperature in vacuo. The yield of crude, pale yellow 1,1,1,6,6,6-hexanitrohexyne-3 is 72% of theory. After recrystallization from carbon tetrachloride or chloroform, it is a white crystalline solid which melts at 129.4–129.7° C. It is detonated by a hammer blow. Ignition temperature 205° C. Vacuum stability 0.67 ml. gas/g./48 hours at 100° C. Oxygen balance —9.

ANALYSIS

|  | Calcd. for $C_6H_4N_6O_{12}$ | Found |
| --- | --- | --- |
| Carbon, percent | 20.47 | 20.40, 20.44 |
| Hydrogen, percent | 1.15 | 1.11, 1.04 |
| Nitrogen, percent | 23.87 | 23.63, 23.82 |

I claim:

1. As a new chemical compound, 1,1,1,6,6,6-hexanitrohexyne-3.

2. The method of making 1,1,1,6,6,6-hexanitrohexyne-3 which comprises commingling a solution of silver nitroform in an inert oxygen-containing volatile organic liquid which is a solvent for the compound hereinafter mentioned with a compound having the formula $XCH_2-C{\equiv}C-CH_2X$ where X is selected from the group consisting of bromine and chlorine in such proportions that the molar ratio of silver nitroform to said compound is at least 2, allowing the mixture to stand until substantially the quantitative amount of silver halide is precipitated, separating said silver halide, and recovering 1,1,1,6,6,6-hexanitrohexyne-3 from the residual mixture.

3. The method of claim 2 wherein said solvent is methyl acetate.

No references cited.

---

[1] Oxygen balance = $\left(O-2C-\dfrac{H}{2}\right)\dfrac{1600}{M}$, where O, C and H are the number of atoms of oxygen, carbon and hydrogen respectively in a molecule of molecular weight M.